(12) United States Patent
Woo et al.

(10) Patent No.: US 9,429,782 B2
(45) Date of Patent: Aug. 30, 2016

(54) APPARATUS FOR SUPPORTING FLAT LIQUID-CRYSTAL DISPLAY OF AUDIO VIDEO NAVIGATION SYSTEM

(71) Applicants: Hyundai Motor Company, Seoul (KR); Hyundai Mobis Co., Ltd., Seoul (KR)

(72) Inventors: Keun Sang Woo, Suwon-si (KR); Jin Hyun Oh, Hwaseong-si (KR); Seung Jin Choi, Seoul (KR); Chun Woo Lee, Osan-si (KR)

(73) Assignees: HYUNDAI MOTOR COMPANY, Seoul (KR); Hyundai Mobis Co., Ltd., Seoul (KR)

( * ) Notice: Subject to any disclaimer, the term of this patent is extended or adjusted under 35 U.S.C. 154(b) by 96 days.

(21) Appl. No.: 14/334,191

(22) Filed: Jul. 17, 2014

(65) Prior Publication Data

US 2015/0160504 A1 Jun. 11, 2015

(30) Foreign Application Priority Data

Dec. 6, 2013 (KR) .................. 10-2013-0151180

(51) Int. Cl.
 *G02F 1/1333* (2006.01)
 *G02F 1/1335* (2006.01)
 *B60K 35/00* (2006.01)

(52) U.S. Cl.
 CPC ......... *G02F 1/133308* (2013.01); *B60K 35/00* (2013.01); *G02F 2001/133314* (2013.01); *G02F 2001/133331* (2013.01)

(58) Field of Classification Search
 CPC .................. G02F 1/133308; G02F 1/133608; G02F 1/13452; G02F 1/133615; G02F 2001/133317; G02F 1/13338; G02F 3/0412; G02F 3/045
 USPC .................................................. 349/58, 12, 11
 See application file for complete search history.

(56) References Cited

FOREIGN PATENT DOCUMENTS

| JP | 2010-083464 A | 4/2010 | |
|----|---------------|--------|----------|
| JP | 2010083464 A * | 4/2010 | ............ B60R 11/02 |
| JP | 2012-093667 A | 5/2012 | |
| KR | 10-2002-0056704 A | 7/2002 | |
| KR | 10-2011-0108907 A | 10/2011 | |
| KR | 10-2011-0119360 A | 11/2011 | |
| KR | 10-2012-0007175 A | 1/2012 | |

* cited by examiner

*Primary Examiner* — Mike Qi
(74) *Attorney, Agent, or Firm* — McDermott Will & Emery LLP

(57) ABSTRACT

An apparatus for supporting a flat liquid-crystal display (LCD) of an audio video navigation (AVN) system of a vehicle includes a module frame including a first through hole formed at a central portion such that an LCD assembly is disposed therein and second through holes formed on both rim portions to expose AVN system manipulation buttons of an AVN system manipulation panel. The LCD assembly is installed within the first through hole of the module frame to be held therein when a front collision impact is applied. A front panel is assembled to a center fascia panel to lock ends of the rim of the module frame and to be parallel to the front side of the LCD assembly.

11 Claims, 3 Drawing Sheets

APPARATUS FOR SUPPORTING FLAT LIQUID-CRYSTAL DISPLAY OF AUDIO VIDEO NAVIGATION SYSTEM

CROSS-REFERENCE TO RELATED APPLICATION

This application claims under 35 U.S.C. §119(a) the benefit of prior to Korean Patent Application No. 10-2013-0151180 filed in the Korean Intellectual Property Office on Dec. 6, 2013, the entire contents of which are incorporated herein by reference.

TECHNICAL FIELD

The present disclosure relates to an apparatus for supporting a flat liquid-crystal display (LCD) of an audio video navigation (AVN) system of a vehicle, and more particularly, to an apparatus for supporting a flat LCD of an AVN system of a vehicle in which an LCD assembly is mounted against a front panel to prevent a rim of a cover glass of the flat LCD from being spread and floated by a broken cover glass during a vehicle collision.

BACKGROUND

An AVN system of a vehicle is a multimedia system for the vehicle in which an audio unit, a video unit, and a telematics including a navigator are integrated into a single unit. The AVN system provides user convenience allowing integral manipulation of various multimedia devices and effective utilization of an instrument panel and a center fascia of the vehicle. An LCD assembly including a touch panel and the like is mounted on the center fascia panel as a display device of the AVN system.

The assembly structure of the existing LCD assembly will now be described with reference to FIG. 1. From the foremost side, an LCD assembly 10, in which an anti-glare (AG) film 11, a touch panel 12, an anti-reflective (AR) film 13, and an LCD panel 14 are sequentially accumulated, is disposed on a center fascia panel as a front panel between a driver's seat and a passenger's seat.

The LCD assembly 10 is mounted by a front panel 20 connected to the center fascia panel (not shown in FIG. 1). An inside portion of the front panel 20 is formed with a close supporting end 22 which is inclined inwardly and downwardly. There is an installation space formed at an outside end, such that AVN system manipulation buttons are installed. Thus, the close supporting end 22 of the front panel 20 is closely attached to a rim surface of the AG film 11 which covers the front rim surface of the LCD assembly 10 and the touch panel 12, so that the LCD assembly 10 can be prevented from being separated.

However, a front side of the LCD assembly 10 is disposed closer to a front side of a vehicle than the front panel 20, i.e., the front side of the LCD assembly 10 is dented in toward the front side of the vehicle, which creates a relatively large step between the front side of the LCD assembly 10 and the front panel 20, and thus, a user may feel inconvenient when manipulating the LCD assembly. Moreover, a rim portion of a front touch area of the LCD assembly 10 is covered by the close supporting end 22, thus decreasing the total area of the LCD assembly being used.

In order to solve such drawbacks, a flat type installation, in which the front side of the LCD assembly is approximately parallel to the front panel, is adopted. Another existing assembly structure for the LCD assembly in which the front side of the LCD assembly is approximately parallel to the front panel. This flat type installation will be described with reference to FIG. 2.

As illustrated in FIG. 2, a rear side of the LCD assembly 10 according to the related art is connected to a rear side of the front panel 20 by a bracket 28, such that the front side of the LCD assembly 10 is parallel to the front side of the front panel 20. Since the front side of the LCD assembly 10 does not have a supporting device, a cover glass 15 made of tempered glass is attached on the touch panel 12, and the AG film 11 is covered thereon to protect the touch panel.

In addition, there is a small height difference where the rim of the LCD assembly 10 is lower than the front panel 20, i.e., the LCD assembly 10 is dented toward the front side of the vehicle, at the boundary between the LCD assembly 10 and the front panel 20.

However, if a collision occurs against the front side of the LCD assembly, not only the cover glass and the touch panel can break, but the rim can be separated and floated from the assembly. Further, the rim of the LCD assembly is separated and floated, thus resulting in subsequent accidents.

SUMMARY

The present disclosure has been made in an effort to solve the above-described problems associated with existing technology. The present disclosure provides a liquid-crystal display (LCD) supporting apparatus for an AVN system of a vehicle adopting a flat type installation in which a front side of an LCD assembly is substantially parallel to a front panel. The LCD assembly is held by a module frame even when a collision occurs against the LCD assembly, and the module frame is held by the front panel so as to prevent the rim of the LCD assembly from being separated and floated.

In accordance with an aspect of the present disclosure, an apparatus for supporting a flat LCD of an AVN system of a vehicle includes a module frame including a first through hole formed at the central portion such that an LCD assembly is disposed therein and second through holes formed on both rim portions to expose AVN system manipulation buttons of an AVN system manipulation panel. The LCD assembly is installed within the first through hole of the module frame to be held therein when a front collision impact is applied. A front panel is assembled to a center fascia panel to lock ends of the rim a module frame rim and to be parallel to a front side of the LCD assembly.

The apparatus further includes a holding end integrally protruding from an inner circumference of the first through hole of the module frame to support and hold a rear rim portion of the LCD assembly.

A cover glass forming the outermost layer of the LCD assembly includes button exposing holes penetrating the cover glass to expose the AVN system manipulation buttons.

The cover glass forming the outermost layer of the LCD assembly has an area covering the whole surface of the module frame in addition to the touch panel of the LCD assembly and is parallel to the front side of the front panel.

The inner circumference of the front panel includes a locking end integrally protruding therefrom to be closely attached to the end of a front rim of the module frame.

The locking end of the front panel forms a locking recess into which the end of the front rim of the module frame in association with a front inner circumference of the center fascia panel.

The rear rim portion of the module frame may be closedly supported by a protrusion protruding from the front rim of the AVN system manipulation panel.

According to the apparatus for supporting an AVN system of a vehicle, a flat type installation in which a front side of the LCD assembly of an AVN system is parallel to the front panel is adopted so that user manipulation feeling and convenience for touching the LD assembly can be improved.

Particularly, even when collision against the LCD assembly occurs in the flat state where the front side of the LCD assembly is parallel to the front panel, since the rim portion of the LCD assembly is held by the module frame and the rim portion of the module frame is held by a locking end of the front panel, the rim portion such as the cover glass of the LCD assembly can be prevented from being separated and floated.

BRIEF DESCRIPTION OF THE DRAWINGS

The above and other features of the present disclosure will now be described in detail with reference to certain exemplary embodiments thereof illustrated by the accompanying drawings which are given hereinbelow by way of illustration only, and thus are not limitative of the present disclosure.

Figure 1:
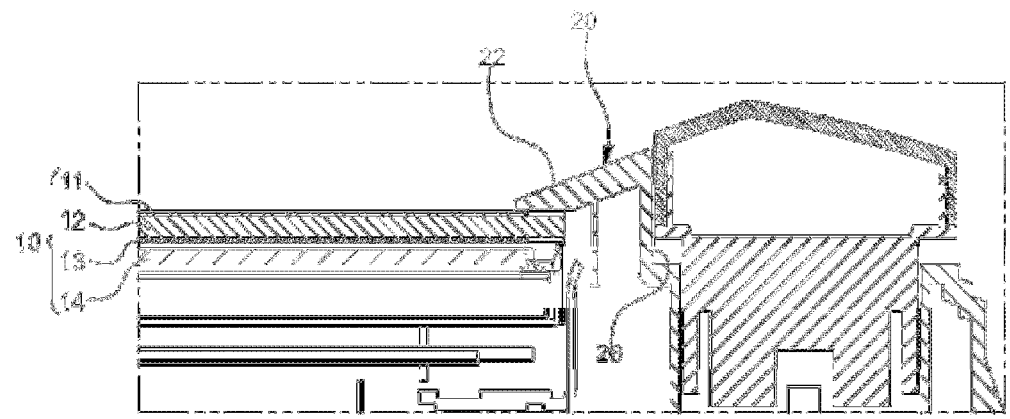
FIG. 1 is a sectional view illustrating an existing assembling structure of a liquid-crystal display (LCD) assembly.
Figure 2:
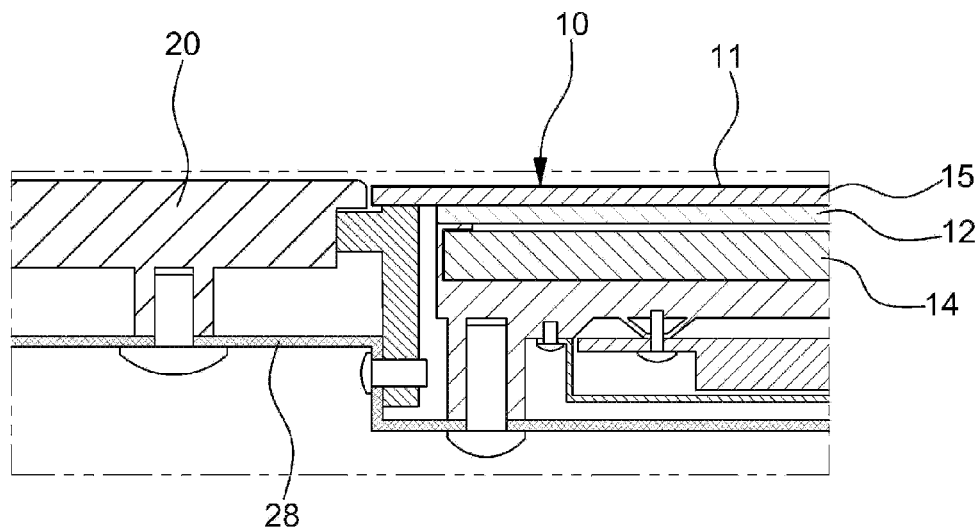
FIG. 2 is a sectional view illustrating another existing assembling structure of an LCD assembly.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, exemplary embodiments of the present disclosure will be described in detail with reference to the accompanying drawings.

According to an apparatus for supporting a flat LCD of an AVN system of a vehicle in the present disclosure, a flat type installation in which a front side of an LCD assembly is substantially parallel to a front panel is applied. Further, the apparatus has a structure in which a rim portion of the LCD assembly is held by a module frame, and the module frame is held by the front panel so as to prevent the rim of the LCD assembly from being separated and floated due to an impact applied to a cover glass of the LCD assembly.

Figure 3:
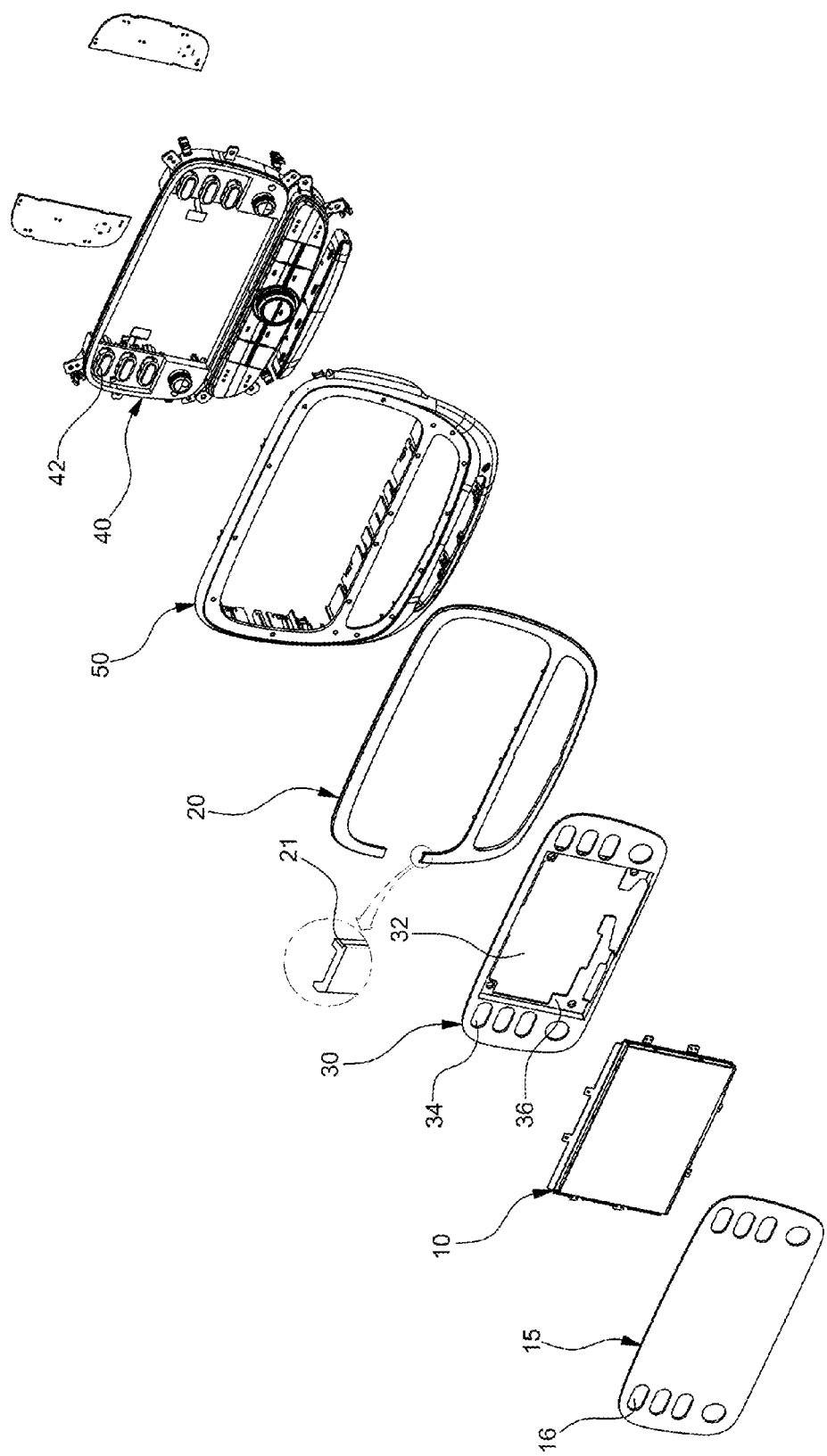
FIG. 3 is an exploded perspective view illustrating an apparatus for supporting a flat LCD for an audio/video/navigation (AVN) system of a vehicle according to an embodiment of the present disclosure.
Figure 4:
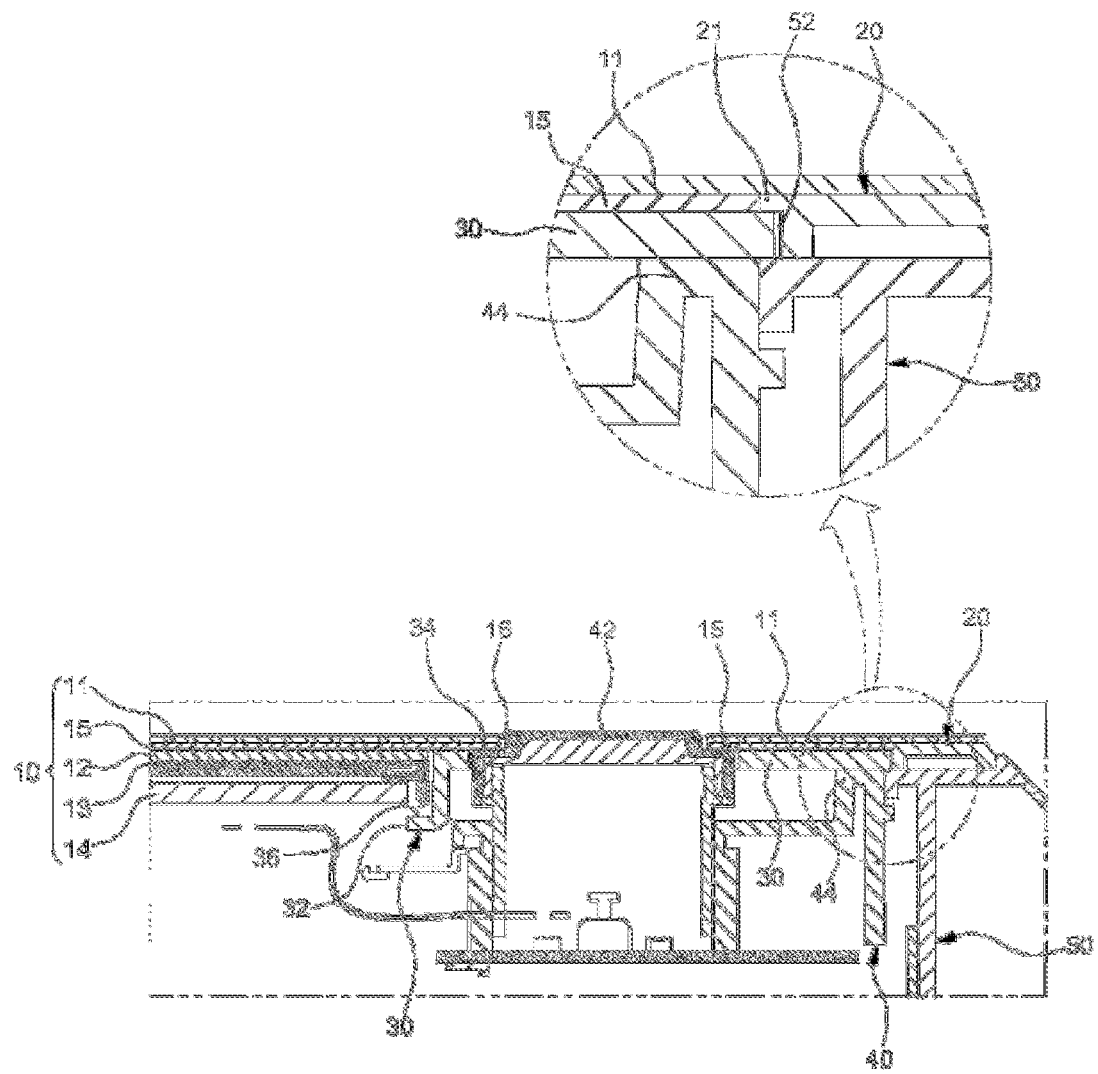
FIG. 4 is a sectional view illustrating an apparatus for supporting a flat LCD for an AVN system of a vehicle according to an embodiment of the present disclosure.

FIGS. 3 and 4 are an exploded perspective view and a sectional view respectively illustrating an apparatus for supporting a flat LCD for an AVN system of a vehicle according to an embodiment of the present disclosure.

An LCD assembly 10 is disposed on a module frame 30 which has a first rectangular through-hole 32. A plurality of second oval through-holes 34 are formed on left and right side of a rim of the module frame 30, such that manipulation buttons 42 of an AVN system manipulation panel 40 pass through.

A vertically bent holding end 36 protrudes from an inner side of the first through hole 32 of the module frame 30, and a rear side rim of the LCD assembly 10 is placed and closely attached to the holding end 36.

The LCD assembly 10 is sequentially stacked by an anti-glare (AG) film 11, a cover glass 15, a touch panel 12, an anti-reflective (AR) film 13, and an LCD panel 14, such that the touch panel 12, the AR film 13, and the LCD panel 14 are disposed on the module frame 30. The rear rim of the LCD panel 14, which is disposed at the most rear side, is supported by the holding end 36.

In this case, the cover glass 15, to which the AG film 11 as the outmost layer of the LCD assembly 10 is attached, has a larger area than other components of the LCD assembly 10. Button exposing holes 16 are configured for the AVN system manipulation buttons 42 of the AVN system manipulation panel 40 to penetrate both left and right side of the rim to expose and to press. That is, the cover glass 15 forming the outermost layer of the LCD assembly 10 has an area larger than that of the touch panel 12 of the LCD assembly 10 to completely cover the touch panel 12 and the module frame 30.

In more detail, a central portion of the cover glass 15 covers the touch panel 12, and both rim portions (the inside and the outside of the second through holes) thereof cover whole area of the module frame 30 except for some of both rim ends of the module frame 30. The front panel 20 is fixed and assembled to a center fascia panel 50 while locking the ends of the both rims of the module frame 30 (some of the rim not covered by the cover glass). In this case, the front side of the cover glass 15 and the front side of the front panel 20 are adjacent to each other in a parallel state.

That is, on the front inner circumference of the front panel 20, a locking end 21 integrally protrudes and is closely attached to the end of the rim of the module frame 30 (some of the rim not covered by the cover glass), such that the locking end 21 adjacent to the rim portion of the cover glass 15 is parallel thereto.

In addition, the locking end 21 of the front panel 20 forms a locking recess 52 into which the end of the front rim of the module frame 30 (some of the rim not covered by the cover glass) is inserted in association with a front inner circumference of the center fascia panel 50. Thus, the end of the front rim of the module frame 30 (some of the rim ends not covered by the cover glass) is inserted into the locking recess 52 and is held by the locking end 21 of the front panel 20.

The rear rim portion of the module frame 30 is closely attached to and supported by a protrusion 44 protruding from the front rim of the AVN system manipulation panel 40. In other words, the protrusion 44 formed on the front rim of the AVN system manipulation panel 40 supports the rear rim portion of the module frame 30, so that the module frame 30 is securely fixed. In this case, a front side of the protrusion 44 of the AVN system manipulation panel 40, and a front side of the center fascia panel 50 are parallel and adjacent to each other.

The flat type installation in which the front side of the LCD assembly 10 and the front side of the front panel 20 are substantially parallel to each other is adopted. That is, the cover glass 15 of the LCD assembly 10 is parallel to the front side of the front panel 20 except for the AVN system manipulation buttons 42, thus improving aesthetical appearance, user manipulation feeling, and convenience for touching the LCD assembly.

Particularly, even when there is a front collision at the cover glass 15 of the LCD assembly 10 in the flat state where the front side of the LCD assembly 10 is parallel to the front panel 20, a rear rim portion of the LCD assembly 10 is supported by the holding end 36 of the module frame 30 to prevent the LCD assembly from being pushed rearward. At the same time, the rim portion of the module frame 30 is held by the locking end 21 of the front panel 20 to prevent the rim portion of the cover glass 15 of the LCD assembly 10, which covers the front side of the module frame 30, from being separated and floated by the collision.

In other words, when an impact occurs at the central portion of the cover glass of the LCD assembly 10, it only damages the central portion of the cover glass 15. However, since the end of the front rim of the module frame 30 (some of the end of the rim not covered by the cover glass) bonded to the rim portion of the cover glass 15 may be inserted into the locking recess 52 to be held and may be covered by the locking end 21 of the front panel 20 to be held, the rim portion of the cover glass 15 bonded to the rim portion of the front side of the module frame 30 is not separated or floated, thus preventing a subsequent accident and passengers from being bumped.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. An apparatus for supporting a flat liquid-crystal display (LCD) of an audio video navigation (AVN) system of a vehicle, the apparatus comprising:
   a module frame including a first through hole formed at a central portion such that an LCD assembly is disposed therein and second through holes formed on left and right sides of a rim to expose AVN system manipulation buttons of an AVN system manipulation panel; and
   a front panel assembled to a center fascia panel to lock ends of the rim of the module frame and to be parallel to a front side of the LCD assembly,
   wherein the LCD assembly installed within the first through hole of the module frame to be held therein when a front collision impact is applied, and
   wherein the LCD assembly is sequentially stacked by an anti-glare (AG) film, a cover glass, a touch panel, an anti-reflective (AR) film, and an LCD panel.

2. The apparatus of claim 1, further comprising: a holding end integrally protruding from an inner circumference of the first through hole of the module frame to support and hold a rear rim portion of the LCD assembly.

3. The apparatus of claim 2, wherein a locking end of the front panel forms a locking recess into which an end of a front rim of the module frame in association with a front inner circumference of the center fascia panel.

4. The apparatus of claim 1, wherein the cover glass forms an outermost layer of the LCD assembly and includes button exposing holes penetrating the cover glass to expose the AVN system manipulation buttons.

5. The apparatus of claim 4, wherein a locking end of the front panel forms a locking recess into which an end of a front rim of the module frame in association with a front inner circumference of the center fascia panel.

6. The apparatus of claim 1, wherein the cover glass forms an outermost layer of the LCD assembly and has an area covering the whole surface of the module frame in addition to the touch panel of the LCD assembly and is parallel to a front side of the front panel.

7. The apparatus of claim 6, wherein a locking end of the front panel forms a locking recess into which an end of a front rim of the module frame in association with a front inner circumference of the center fascia panel.

8. The apparatus of claim 1, wherein an inner circumference of the front panel includes a locking end integrally protruding therefrom to be closely attached to an end of a front rim of the module frame.

9. The apparatus of claim 8, wherein the locking end of the front panel forms a locking recess into which the end of the front rim of the module frame in association with a front inner circumference of the center fascia panel.

10. The apparatus of claim 1, wherein a locking end of the front panel forms a locking recess into which an end of a front rim of the module frame in association with the front inner circumference of the center fascia panel.

11. The apparatus of claim 1, wherein a rear rim portion of the module frame is supported by a protrusion protruding from a front rim of the AVN system manipulation panel.

* * * * *